United States Patent [19]

Clary et al.

[11] 4,061,601
[45] Dec. 6, 1977

[54] ELECTRICALLY CONDUCTIVE REAR VIEW MIRROR

[75] Inventors: Jerome Francis Clary; Robert Emerson Wiley; Richard Earl Bowns, all of Port Huron, Mich.

[73] Assignee: Acheson Industries, Inc., Port Huron, Mich.

[21] Appl. No.: 656,122

[22] Filed: Feb. 9, 1976

Related U.S. Application Data

[62] Division of Ser. No. 364,749, May 29, 1973, Pat. No. 3,948,811.

[51] Int. Cl.² ............................................. H01B 1/06
[52] U.S. Cl. .................................. 252/511; 252/512; 252/514; 428/343; 428/421; 219/219
[58] Field of Search .................... 252/511, 512, 514; 428/421, 343; 427/122; 219/219

[56] References Cited

U.S. PATENT DOCUMENTS

| | | | |
|---|---|---|---|
| 2,730,597 | 1/1956 | Podolsky et al. | 252/511 X |
| 3,056,750 | 10/1962 | Pass | 252/512 X |
| 3,457,537 | 7/1969 | Hines | 252/511 X |
| 3,513,064 | 5/1970 | Westley | 428/421 X |
| 3,576,387 | 4/1971 | Derby | 252/511 X |
| 3,624,347 | 11/1971 | Todd et al. | 219/219 |
| 3,850,674 | 11/1974 | Clarke et al. | 428/421 X |

OTHER PUBLICATIONS

Condensed Chemical Dictionary (8th Ed.) p. 168.

Primary Examiner—Benjamin R. Padgett
Assistant Examiner—E. Suzanne Park
Attorney, Agent, or Firm—Harness, Dickey & Pierce

[57] ABSTRACT

An electrically conductive product generally comprised of a substrate or web coated with or impregnated with an electrically conductive thermally stable material which includes a special polymeric binder and conductive particles to produce the final conductive sheet.

7 Claims, 6 Drawing Figures

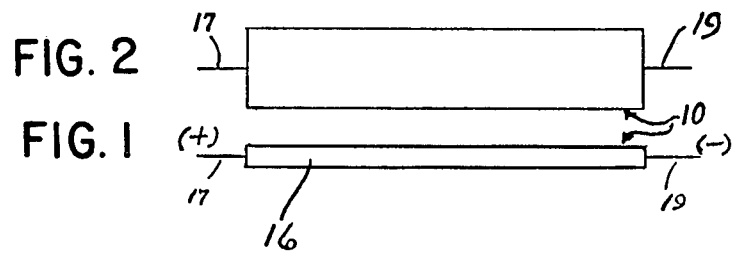
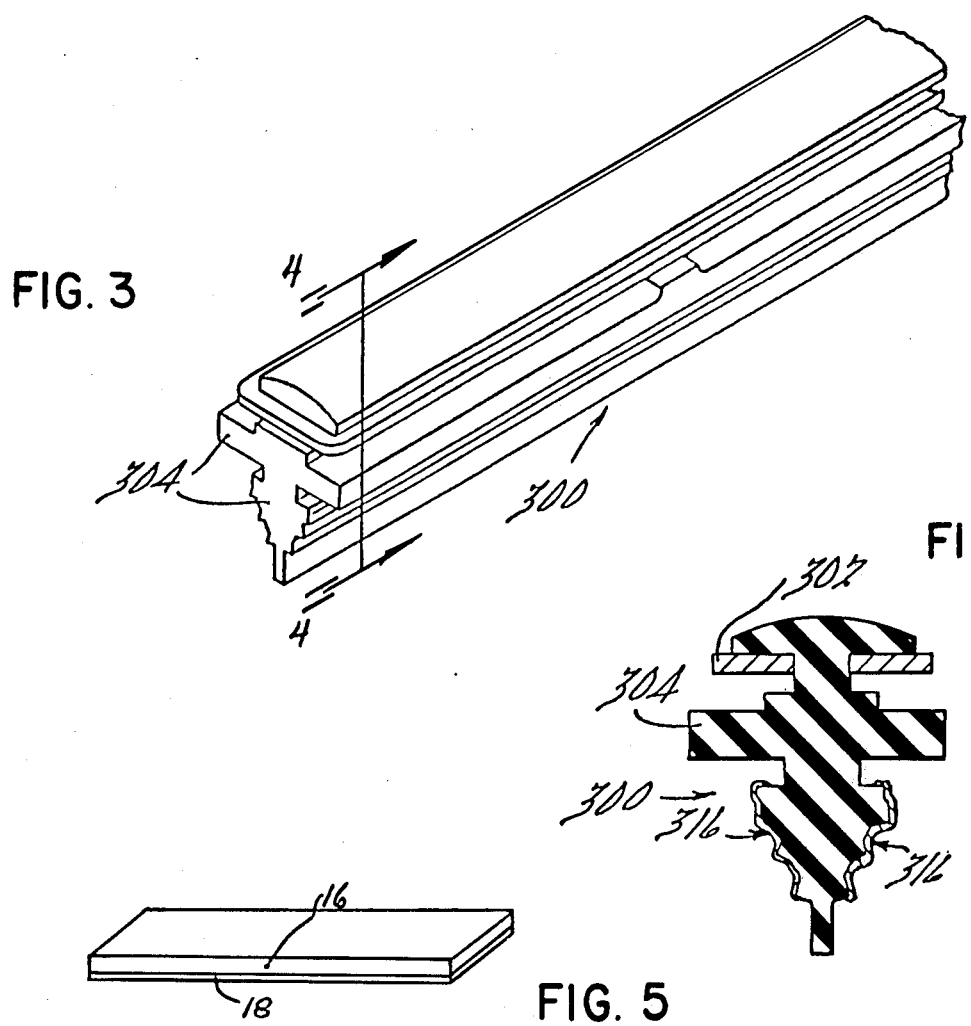
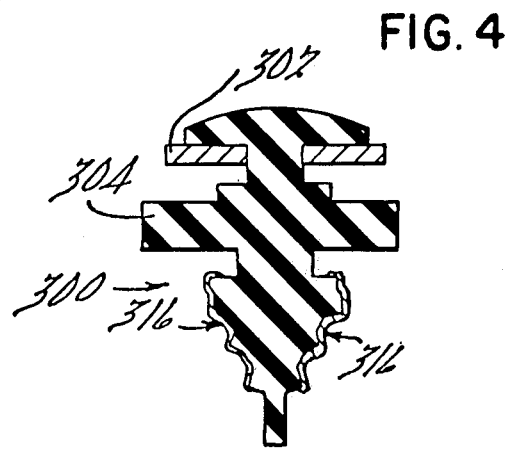
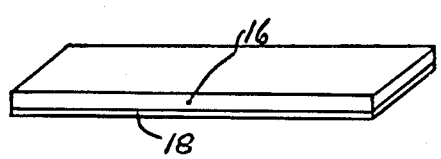
FIG. 2
FIG. 1
FIG. 3
FIG. 4
FIG. 5

ELECTRICALLY CONDUCTIVE REAR VIEW MIRROR

This is a division, of application Ser. No. 364,749, filed May 29, 1973 now U.S. Pat. No. 3,948,811.

BACKGROUND OF THE INVENTION

This invention broadly relates to a new electrically conductive sheet material and composition. More particularly this invention relates to electrically conductive sheet material which is highly useful for generating heat at low voltages, for example, it finds particular utility in windshield wiper applications where the sheet in contact with the wiper blade may be heated to free the wiper when it is frozen in position during winter weather; or, it may be used in contact with the outside rear view mirror to heat same and remove ice or snow.

The state of the art is indicated by the following references: U.S. Pat. Nos. 3,099,578; 3,573,230; 2,983.624; 3,025,185; 2,968,649; 3,132,124; 3,051,677; DuPont Viton Bulletin No. 16 "Solution Coatings of Viton" by J. M. Bowman; and, DuPont's "The Engineering Properties of Viton Fluoroelastomer"; and, Acheson Industries Inc. product data sheet for "Electrodag 415". The disclosures of these references are hereby incorporated herein by reference.

Accordingly a main object of this invention is to provide a novel electrically conductive sheet type material.

Another object of the present invention is to provide an electrically conductive rear view mirror having a substrate with an electrically conductive coating composition thereon.

Another object of the present invention is to provide a new sheet material or product which is uniquely suitable in windshield wiper applications for applying heat to the wiper blade to free same under adverse weather conditions as occur in winter from ice, snow, or freezing rain, and thus providing a considerably safer windshield wiper system.

Another object of the present invention is to provide a new flexible pressure sensitive adhesive tape sheet which is electrically conductive as herein described.

Another object of the present invention is to provide a new electrically conductive sheet product which incorporates a special combination of thermally stable fluoroelastomer polymer resin component and a conductive pigment component.

Another object of the present invention is to provide a novel heat generating product, which may be stamped out in decal form or in various patterned shapes.

Another object of the present invention is to provide a novel electrically conductive sheet material or composition which is uniquely capable of having electrical contacts soldered to its surface.

Other objects, features, and advantages of the present invention will become apparent from the subsequent description and the appended claims taken in conjunction with the accompanying drawings.

BRIEF DESCRIPTION OF THE DRAWINGS

FIG. 1 illustrates an electrically conductive sheet type material in accordance with the invention;

FIG. 2 is a top view of FIG. 1;

FIGS. 3 and 4 illustrate a windshield wiper application of the invention herein, with FIG. 4 being a cross sectional view along the line 4—4 in FIG. 3;

FIG. 5 illustrates an electrically conductive sheet material in accordance with the invention herein which is made in the form of a pressure sensitive adhesive tape.

SUMMARY OF THE INVENTION

Figure 6:
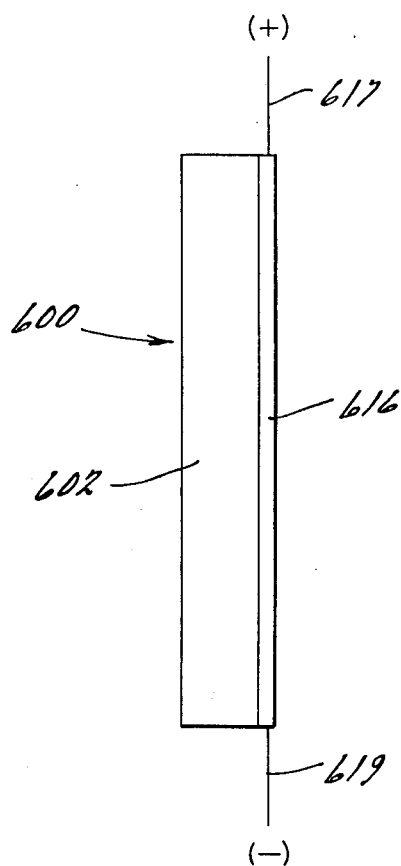
FIG. 6 is a cross-sectional view of a rear view mirror application of the invention herein.

This invention of an electrically conductive sheet or heat generating sheet is capable of providing low resistance elements useful for generating heat at low voltages, such as in the range of 1–40 volts as used in battery powered devices or automotive, industrial and recreational vehicles. Also the sheet material discovered and disclosed herein is suitable and adaptable for heat generation at electrical voltages normally used for household electrical current. The sheet material herein may satisfactorily be formed on and supported by a woven or nonwoven glass web or felted fabric (from which, for the highest temperature stability, it is desirable to burn off or remove the bonding and sizing material employed in its manufacture).

By providing the supporting web, the sheets formed are characterized by flexibility, strength, and mechanical stability not possessed by earlier known coatings or films. The self-supporting sheets of this invention can be fabricated and insulated for use as such or bonded to substrates.

Preferred substrates for use herein are web members available in thicknesses from about 1 mil up to approximately 20 mils. By employing the special compositions as are disclosed herein comprising heat resistant polymeric binder and conductive particles, it is possible to position or entrap controllable amounts of conductive particles on the web or within voids and interstices of the web, in such a way that the electrical resistance can be controlled, and thermally stable, mechanically strong, flexible, conductive webs or sheets may thus be formed.

The electrical resistance and the heat generating capacity is a function of the nature and the composition of the web, the pigment-binder ratio, the extent to which the sheet or web matrix is saturated, and the thickness of the web or sheet.

DESCRIPTION OF PREFERRED EMBODIMENTS

FIGS. 1 and 2 illustrate a preferred form of the conductive sheet prepared in accordance with the invention designated 10. The sheet 10 is made from a nonwoven glass web which has previously had bonding or sizing agents removed therefrom. A special composition 16 is impregnated into the web with the composition 16 being made from a thermally stable heat resistant polymeric binder and conductive particles. The material of the conductive sheet 16 may be uniquely receptive to having electrical leads or electrical contacts 17 and 19 soldered thereto as will be explained in more detail hereinbelow.

FIGS. 3 and 4 illustrate a windshield wiper device in accordance with the invention wherein the electrical properties of the conductive sheet herein described are utilized in conjunction with a windshield wiper 300 for the purpose of transferring electrically generated heat to the wiper 300 to heat same to free the wiper from an ice-bound condition during winter weather. The wiper 300 is suitably constructed in a known fashion utilizing for example a metal reinforcing member 302 for supporting a flexible rubber portion 304 with the wiper being supported through the reinforcing member 302 to the oscillating arm (not shown) which moves the wiper through its back and forth motion during use. As will be noted the wiper contains electrically conductive sheet 316 applied thereto which sheet 316 is formed in accordance with the invention herein. The sheet 316 is electrically conductive and is adapted to be connected with lead wires which operate to introduce electrical current to the sheet 316 for the purpose of heating the wiper in order to free the wiper from an ice-bound condition. The sheet 316 may be associated with or applied to the wiper 300 by any suitable means such as through the use of an adhesive or the like.

It should also be understood that the electrically conductive sheet 316 may also suitably be deposited in strip form to a flat surface on which the rubber wiper blade 300 comes to rest when the wiper is in its parked position. By this technique the flat surface of the electricaly conductive sheet 316 would be in contact with the wiper only when the wiper was in its parked position, however, electrically conductive heat in this embodiment is still applied to the electrically conductive sheet 316 to free the wiper from an ice-bound condition so that the wiper could then move upwardly into its oscillating mode of operation for wiping the windshield of the vehicle.

FIG. 5 illustrates another embodiment of the invention herein wherein the electrically conductive sheet 16 has a pressure sensitive adhesive (PSA) coating or layer 18 applied to at least one side thereof. Numerous suitable pressure sensitive adhesives may be used for this purpose with a suitable pressure sensitive adhesive being that described in U.S. Pat. No. 2,884,126, or Monsanto Co., Gelva multi-polymer solution, RA-1753, pressure sensitive adhesive. The pressure sensitive adhesive preferred is a high temperature resistant acrylic or silicone type. Said patent also describes different techniques for applying the pressure sensitive adhesive 18 to backing support such as the electrically conductive sheet 16. Application of the pressure sensitive adhesive 18 is suitably carried out by knife coating, roller coating, dry transfer coating, or semi-wet transfer coating.

Electrically conductive sheet 16, as shown in FIG. 1 may also be applied to one surface of a double adhesive sided pressure sensitive adhesive tape to obtain a conductor which may be applied to any substrate surface in a convenient fashion. The electrical contacts may then be soldered at the desired points. This construction may then be insulated by covering it with another pressure sensitive adhesive tape. Also by applying pressure sensitive adhesive tape to either side of the sheet 16 insulated sheet heating elements or resistive members can be obtained. Electrical resistance may be adjusted to desired level by altering the conductive particles, the pigment-binder ratio, and the shape of the conductor.

FIG. 6 illustrates an electrically conductive rear view mirror 600 in accordance with the present invention, in which the back side of the mirror glass portion 602 is coated with electrically conductive coating composition 616. Electrical leads or contacts 617 and 619 may be soldered to the coating 616 in order to introduce electrical current to said coating for the purpose of heating the mirror glass portion 602 and thereby melting any ice or snow.

The fluoroelastomer and the silicone elastomer materials used herein should be present within the broad range of about 5% to about 90% by weight of the coating solids and preferably from about 5% to about 80% by weight. The fluoroelastomer or the silicone elastomer materials provide the special function of endowing the coating with the high thermal stability, that is, stability at temperatures of about 400°–700° F and higher. The fluoroelastomer material used in the invention should be one which provides this high thermal stability while at the same time possessing the property of being able to operate as an effective binder. Particularly suitable materials for use as the fluoroelastomer herein may be described as vinyl/olefinic fluoroelastiomeric polymers, vinyl-fluorocarbon elastomeric copolymers, vinylidene/fluoro-olefinic elastomeric polymers, and $C_2$–$C_4$ olefinic/fluorocarbon elastomeric polymers. A preferred material is the vinylidene fluoride/hexafluoropropylene copolymer fluoroelastomer. Commercially available fluoroelastomers which may be used are Viton A or B, (DuPont trademark) and Fluorel FC-2170 or KF-2140 (3 M Company trademark). Still further fluoroelastomers which may be used herein are described in U.S. Pat. Nos. 2,968,649, 3,051,677, and 3,172,124, the disclosures of which are incorporated herein by reference. A commercially available silicone elastomer for use herein is Union Carbide Silicone product KS-1315. The preferred silicone elastomeric resin should be high temperature resistant and have a stable pot life in admixture with other ingredients of the composition.

The conductive particles or pigment for use in the sheet or coating should be present within the broad range of about 10% to about 95% by weight of the total solids of the coating and preferably this range should be from about 20% to about 95% by weight. Suitable particles or pigments for use in the coating are various finely particulated pigments such as silver particles, copper particles, graphite, conductive carbon, silver coated particles, noble metals and alloys thereof. Silver or silver coated particles are preferred for the formation of highly conductive sheets. With conductive carbon the percentage range would normally be 20–30% and with silver it would normally be 85–95%. Compositions incorporating metallic conductive particles are wetted by conventional soldering alloys.

The silver pigment preferably employed is a silver powder having for example a mesh size of about 90% through 325 mesh; and an apparent density of about 16–32 grams per cubic inch (Scott volumeter).

Impregnation of the web with conductive material is achieved by the use of paint-like compositions which include the pigment particles and the binder in suitable solvents. The fluid or pasty composition is applied to the web and then dried and cured.

Solvents which are suitable for the compositions are those which are compatible with and also act as solvents for the fluoroelastomer constitutent.

The percentage of metallic conductive pigment particles required in this coating composition should be above the minimum levels as generally described above in order to obtain coatings to which solder will adhere readily and to provide suitable conductivity. This is a function to some extent of the particle size and shape of the silver particles, and the particular fluoroelastomer material being used. When the conductive particle content, such as the silver particles, is over 95% the coatings lose integrity and adhesion.

The fluid carrier material used for forming solutions or dispersions of the coating material may satisfactorily be selected from any number of different compatible solvents and blends thereof such as methylethyl ketone, acetone, various other ketone or ester type solvents, dimethylformamide, and numerous other organic solvent materials or water. The coating compositions may suitably have total solids contents between about 1% and 80% by weight. The carrier fluid is driven off or evaporated to leave the dry coating bonded within or on the web.

A curing agent may optionally be used in the coating. For this purpose various amino type curing agents and peroxide curing agents and the like may be used.

The web may be any flexible porous inorganic fibrous material. Among commercially available web materials are Nomex (DuPont) and Craneglas (Crane & Co. Inc.).

resistance character of coatings such as may be applied to a web is evaluated by forming dried coatings under uniform conditions, upon which the electrical resistance measurements can be made. Measurements herein have been made on a coating after curing for ten minutes at 300° F.

The electrical resistance was measured using a special fixture which gave data in ohms per square. The resistance measurement was made with a suitable precision milliohmmeter.

The following are example coatings with which a glass type paper web may be impregnated to form sheets suitable for generating heat with applied voltage.

|  | Example 1 | Exaple 2 | Example 3 |
|---|---|---|---|
| Silver Powder | 90.91 | 93.35 | 71.49 |
| *Fluoroelastomer #1 | 9.09 | 6.65 | 28.51 |
| Methyl Ethyl Ketone | 62.33 | 23.34 | 240.42 |
| Resistance ohms per square at 1 mil thickness. | 0.19 | .152 | 1.7 |
|  | Example 4 | Example 5 | Example 6 |
| Silver Powder | 93.35 | 93.35 | 90.32 |
| *Fluoroelastomer #2 |  | 6.65 |  |
| #3 | 6.65 |  | 9.68 |
| Methyl Ethyl Ketone | 66.68 | 66.68 | 77.42 |
| Resistance ohms per square at 1 mil thickness | .3 | .15 | .23 |

*Note
1 = Viton B (DuPont)
2 = M's FC-2170
3 = 3 M's KF-2140

EXAMPLE 7

|  | Example 7 |
|---|---|
| Silver Powder | 90.50 |
| Union Carbide Silicone Rubber (KS 1315 at 35% Solids | 9.50 |
| Xylol | 87.00 |
| Lubrizol 500 R (Dicumyl Peroxide) | 0.68 |
| Resistance ohms per square at 1 mil thickness | 0.20 |

Viton B(Fluoroelastomer 1) is a terpolymer of vinylidene fluoride - hexafluoropropylene and a small amount of tetrafluoroethylene. The fluoroelastomer material 3M FC-2170 (Fluoroelastomer 2) is a fluoroelastomer polymer material made by Minnesota Mining & Manufacturing Company having the following physical properties:

| Specific Gravity | 1.81 |
|---|---|
| Appearance | opaque, off-white |
| Solubility | Esters and Ketones |
| Mooney Viscosity - Large Rotor at 212° F 4 Minute Reading | 60 |

The fluoroelastomer material 3M KF-2140 (Fluoroelastomer 3) is a fluoroelastomer polymer material made by Minnesota Mining and Manufacturing Company having the following physical properties:

| Specific Gravity | 1.81 |
|---|---|
| Appearance | opaque, off-white |
| Solubility | Esters and Ketones |
| Mooney Viscosity - Large Rotor at 212° F 4 Minute Reading | 110 |

EXAMPLE NO. 8

Using the material from Example No. 1 a 5 mil sample of glass paper (Craneglas) from Crane Co. was coated by passing the web through a bath of the Example No. 1 coating and then through a squeegee to a heating oven.

This is a typical "spreader" squeegee operation as is common in the tape or paper industry. Impregnation occurred and the sheet was cured for an equivalent time of 10 minutes at 300° F.

With 5 mil paper the average resistance was 0.008 ohms per square.

EXAMPLE NO. 9

The procedure of Example 8 was repeated impregnating 3 mil thick glass paper using a reduction of one part of solvent (MEK) to four parts of Example No. 1 material. The average resistance of the sheet produced was 0.043 ohms per square.

While it will be apparent that the preferred embodiments of the invention disclosed are well calculated to fulfill the objects above stated, it will be appreciated that the invention is susceptible to modification, variation, and change without departing from the proper scope or fair meaning of the subjoined claims.

What is claimed is:

1. An electrically conductive rear view mirror having a substrate with an electrically conductive coating composition thereon,
    said composition comprising in weight percent,
    about 5% to about 90% of a heat stable fluoroelastomer polymer about 10% to about 95% of conductive particles, said conductive particles are a finely particulated material selected from at least one material from the group consisting of silver, copper, noble metals and alloys thereof, graphite, or conductive carbon, said composition being for the purpose of heating the mirror.

2. The invention of claim 1 wherein, said conductive particles are substantially of graphite or conductive carbon.

3. The invention of claim 1 wherein,
    said conductive particles are substantially graphite particles.

4. The invention of claim 1 wherein,
    said fluoroelastomer polymer is comprised at least partially of a vinyl/olefinic fluoroelastomeric polymer material.

5. The invention of claim 1 wherein,
    said electrically conductive coating composition is applied to the back side of said substrate.

6. An electrically conductive rear view mirror having a substrate with an electrically conductive sheet thereon in adhesive tape form,
   said sheet including an electrically conductive composition comprised of, in weight percent,
      about 5% to about 90% of heat stable fluoroelastomer polymer, and
      about 10% to about 95% of conductive particles, said conductive particles being a finely particulated material selected from at least one material from the group consisting of silver, copper, noble metals and alloys thereof, graphite, or conductive carbon, said composition being for the purpose of heating the mirror.

7. In a rear view mirror apparatus, the improvement comprising,
   an electrically conductive sheet material in adhesive tape form, said sheet having an adhesive coating applied to at least one side thereof,
   said sheet including an electrically conductive composition comprised of, in weight percent,
      about 5% to about 90% of heat stable fluoroelastomer polymer, and
      about 10% to about 95% of conductive particles, said conductive particles being a finely particulated material selected from at least one material from the group consisting of silver, copper, noble metals and alloys thereof, graphite, or conductive carbon, said composition being for the purpose of heating the mirror.

* * * * *